United States Patent
Thielemans et al.

(10) Patent No.: US 7,902,511 B2
(45) Date of Patent: Mar. 8, 2011

(54) METHOD OF AND SOFTWARE FOR CALCULATING A SCATTER ESTIMATE FOR TOMOGRAPHIC SCANNING AND SYSTEM FOR TOMOGRAPHIC SCANNING

(75) Inventors: Kris Filip Johan Jules Thielemans, London (GB); Charalampos Panos Tsoumpas, London (GB); Floribertus P. M. Heukensfeldt Jansen, Ballston Lake, NY (US)

(73) Assignees: Hammersmith Imanet Ltd., London (GB); General Electric Company, Niskayuna, NY (US)

( * ) Notice: Subject to any disclaimer, the term of this patent is extended or adjusted under 35 U.S.C. 154(b) by 70 days.

(21) Appl. No.: 12/518,334

(22) PCT Filed: Dec. 18, 2007

(86) PCT No.: PCT/GB2007/004874
§ 371 (c)(1),
(2), (4) Date: Jun. 9, 2009

(87) PCT Pub. No.: WO2008/075037
PCT Pub. Date: Jun. 26, 2008

(65) Prior Publication Data
US 2010/0086101 A1  Apr. 8, 2010

Related U.S. Application Data

(60) Provisional application No. 60/870,421, filed on Dec. 18, 2006.

(51) Int. Cl.
*G01T 1/164* (2006.01)

(52) U.S. Cl. .................................................. 250/363.04
(58) Field of Classification Search ............. 250/363.03, 250/363.04, 363.07, 369; 378/21
See application file for complete search history.

(56) References Cited

OTHER PUBLICATIONS

Accorsi, R. et. al. "Implementation of a single scatter simulation algorithm for 3D PET: application to emission and transmission scanning" 2002 IEEE Nuclear Science symposium conf. record Norfold V, Nov. 10-16, 2002, vol. 2, pp. 816-820.
Holdsworth, CH.H., et. al. "Performance analysis of an improved 3-D PET Monte Carlo simulation and scatter correction" IEEE transactions on Nuclear Science, New York, vol. 49, No. 1, Feb. 2002.
PCT/GB2007/004874 ISRWO dated Dec. 2007.

*Primary Examiner* — David P Porta
*Assistant Examiner* — Mark R Gaworecki
(74) *Attorney, Agent, or Firm* — Robert F. Chisholm

(57) ABSTRACT

The method calculates a scatter estimate for scatter correction of detection data from a subject in a positron emission tomographic scanner. The detection data represent the scattered events and unscattered events of annihilation photons emitted in the subject. The method uses the following steps:
  determine an estimate of the unscattered events;
  determine a simulation of the scattered events;
  determine a value of a scaling factor by fitting the sum of the estimate of the unscattered events and a product of the scaling factor and the simulation of the scattered events to the detection data; and
  determine the scatter estimate as the product of the scaling factor having said value and the simulation of the scattered events.

17 Claims, 5 Drawing Sheets

| t | D1 | D2 |
|---|----|----|
|   |    |    |

METHOD OF AND SOFTWARE FOR CALCULATING A SCATTER ESTIMATE FOR TOMOGRAPHIC SCANNING AND SYSTEM FOR TOMOGRAPHIC SCANNING

This application is a filing under 35 U.S.C. 371 of international application number PCT/GB2007/004874, filed Dec. 18, 2007, which claims priority to application No. 60/870,421 filed Dec. 18, 2006, in The United States the entire disclosure of which is hereby incorporated by reference.

FIELD OF THE INVENTION

The invention relates to a method for calculating a scatter estimate for scatter correction of detection data from a subject in a tomographic scanner, the detection data representing the scattered events and unscattered events of annihilation photons emitted by the subject. The invention also relates to software carrying out the method, a data carrier comprising the computer software and a tomographic scanning system adapted for carrying out the method.

BACKGROUND OF THE INVENTION

A typical emission scan using a positron emission tomography (PET) scanner starts with the injection of a solution including a tracer into the subject to be scanned. The subject may be human or animal. The tracer is a pharmaceutical compound including a radioisotope with a relatively short half-life. The tracer has been adapted such that it is attracted to sites within the subject where specific biological or biochemical processes occur. The tracer moves to and is typically taken up in one or more organs of the subject in which these biological and biochemical processes occur.

When the radioisotope decays, it emits a positron, which travels a short distance before annihilating with an electron. The short distance, also called the positron range, is of the order of 1 mm in common subjects. The annihilation produces two high energy photons propagating in substantially opposite directions. The PET scanner includes a photon detector array, usually in a ring-shaped pattern, arranged around a scanning area in which the subject or at least the part of interest of the subject is arranged.

When the detector array detects two photons within a short timing window, a so-called 'coincidence' is recorded. The detector may estimate the energy of the incident photons and only keep events for which this energy is in one or more predetermined energy windows. The line connecting the two detectors that received the photons is called the line of response (LOR). The reconstruction of the image is based on the premise that the decayed radioisotope is located somewhere on the LOR. It should be noted that in fact the annihilation occurs on the LOR and the decayed radioisotope is a positron range removed from the point of annihilation. The relatively short positron range may be neglected or can be compensated for in the reconstruction. Each coincidence may be recorded in a list by three entries: two entries identifying the two detectors, one entry representing the time of detection. Some tomographic scanner systems can record additional information such as the estimated energy of the detected photons or the difference between the detection times of the two photons in the so-called Time Of Flight (TOF) PET. The coincidences in the list can be grouped in one or more sinograms. A sinogram is typically processed using image reconstruction algorithms to obtain volumetric medical images of the tracer and, therewith, of the subject.

The detector array of a typical PET scanner normally does not rotate during an acquisition and is generally arranged in two or more banks of stationary detector rings. Alternatively, the detectors may be arranged in a non-ring-shaped pattern. In most detector configurations there will be directions in which coincidences are not detectable due to the geometry of the detector array, since the scanner has a finite field of view and there may be blind spots due to gaps between the detectors.

To obtain quantitative results from a PET scan, the processing must, among others, take into account the attenuation of the photons within the subject. An estimate of the attenuation may be obtained by making test scans in which one or more positron emitter rod sources are arranged in the scanner. The sources may be made of a material such as $^{68}$Ge, which emits dual annihilation photons. Conventionally, two scans are used to derive the attenuation estimate, a blank scan in which the subject being scanned is not present in the scanning area and, typically, the scanner is empty except for the presence of the sources, and a transmission scan in which both the subject and the sources are present in the scanning area. The results of the blank scan are then divided by the results of the transmission scan, providing an attenuation sinogram. The attenuation sinogram can be used to correct the emission scan of the subject for the effects of attenuation. The attenuation may also be estimated from the emission data only. Alternatively, the attenuation information can be derived with other methods such as X-ray computed tomography (CT) or magnetic resonance imaging (MRI).

Another image degrading factor is the scattering of annihilation photons within the subject. Compton scattering is the dominant mechanism of interaction of the photon in the human tissue. The ratio of scattered photons to the total number of photons detected may be up to 50%. The two photons of an annihilation do not in general travel in opposite directions any more after scattering. Hence, the decayed radioisotope will in general not be located on the LOR of a scatter event. Scatter events therefore degrade the image and the detection data are preferably corrected for scatter. A coincidence without scattering resulting from a single annihilation, where the radioisotope lies on the LOR, is called an unscattered event.

A method for scatter correction is known from the article 'New, Faster, Image-Based Scatter Correction for 3D PET' by C. C. Watson in IEEE Transactions on Nuclear Science, Vol. 47, No. 4 (2000) pages 1587-1594. The method starts by reconstructing an image from the detection data that are not corrected for scatter. An estimate of the scatter is determined using a physical model for the scatter events in the image. The model provides a simulation of the scatter events using an estimate of the image and of the attenuation. The method calculates a probability for a single-scatter event by tracing two photons resulting from an annihilation, one of which is scattered between the point of annihilation and the detector. The attenuations of the two photons along their paths to the detectors are multiplied with the scatter cross-section and the detector cross sections. A single-scatter simulation is obtained by integrating the probability over all annihilation points and scatter points. A scatter image is reconstructed from the scatter estimate and subtracted from the image derived from the detection data. The resulting image is scatter corrected. Other methods to simulate scatter are based on Monte Carlo calculations [Holdsworth, C. H., Levin, C. S., Janecek, M., Dahlbom, M. a., and Hoffman, E. J. (2002). Performance Analysis of an Improved 3-D PET Monte Carlo Simulation and Scatter Correction. IEEE Trans Nuclear Sci 49, 83-89.] or on comparing measurements of different energy windows. Scatter simulation based on hybrid methods is disclosed in the article by Ferreira, et al, "A Hybrid Scatter Correction for 3D PET based on an Estimation of the Distribution of Unscattered Coincidences: Implementation on the ECAT EXACT HR+." Phys. Med. Biol.: 1555-1573 (2002).

In some cases the scatter simulation does not provide a sufficiently accurate quantitative estimate of the scatter, e.g. because of multiple scatter and scatter from parts of the body outside the field of view of the scanner. The accuracy of the estimate can be improved by scaling the scatter simulation. Scaling is carried out by multiplying the counts in the scatter simulation by one or more scaling factors. A fit of the product of the scatter simulation and the scaling factor to the detection data provides a value of the scaling factor. Many current methods use the so-called tail fitting method. The distribution of the detection data has usually a central portion flanked by tails. The tails are caused by events having LORs that do not intercept the subject and, hence, relate to scatter events only. The fit is carried out in the tails of the distribution only.

A disadvantage of the known method for determining a scatter estimate is the inaccuracy of the scatter estimate. It is an object of the invention to provide a method for calculating an improved scatter estimate, computer software, a data carrier and a scanner system for carrying out the method.

SUMMARY OF THE INVENTION

The object of the invention is achieved in a method for calculating a scatter estimate for scatter correction of detection data from a subject in a tomographic scanner, the detection data representing the scattered events and unscattered events of photons emitted in the subject, using the following steps: determine an estimate of the unscattered events; determine a simulation of the scattered events; determine a value of a scale factor by fitting the sum of the estimate of the unscattered events and a product of the scale factor and the simulation of the scattered events to the detection data; and determine the scatter estimate as the product of the scale factor having said value and the simulation of the scattered events.

In a positron emission tomographic scanner the events relate to annihilation photons. The estimate and simulation of events normally relate to an estimate and simulation of a distribution of events over a series of detectors. The estimate of the unscattered events is in general available in a method for reconstructing the image from the detection data. The method can also be used in single photon emission computed tomography (SPECT), where the decaying radioisotope produces a single photon instead of two photons in PET.

The inaccuracy of the known method for determining a scatter estimate resides at least in part in the inaccuracy of the scale factor determined from the fit. The low quality of the fit may be caused by relatively small tails and or low number of events in the tails, which can occur in whole body scans. This may make the fit inaccurate, resulting in an inaccurate scatter estimate. Another cause may be that the model used for making the simulation of the scatter events does not properly describe the scatter behaviour in the tails. Due to these causes the scatter estimate in the central portion of the distribution is often inaccurate. The effect of these causes of inaccuracy is reduced if, according to the invention, a fit is made not only of the scatter estimate but of the sum of the scatter estimate and the estimate of the unscattered events. The improved fit provides a greater accuracy of the value of the scaling factor and therewith an improved scatter estimate.

The detection data generally includes a distribution having a central portion corresponding to lines of response that intercept the subject. In a special embodiment the fitting is performed over the central portion or over a part of the central portion.

In a preferred method, wherein the detection data includes a distribution having a central portion flanked by tails, the fitting is performed over a region of the distribution including at least part of the tails and at least part of the central portion. The tails of the distribution may be defined as corresponding to events having lines of response that do not intercept the subject. The extension of the fit area of the tails to a fit area including at least part of the tails and at least part of the central portion of the distribution improves the quality of the fit.

In a preferred embodiment of the method the scatter estimate is determined in a series of iteration steps, the region of the distribution over which the fitting is performed being increased between two of the iteration steps. The increase of the fitting region improves the stability of the method. In a first iteration step the fit may for example be performed over the tails or part of the tails of the distribution only and in a subsequent iteration step the fitting region is extended into the central portion. The region may be extended several times during the iteration and may cover the entire distribution.

In a further preferred embodiment the fitting is carried out over part of the tails and the entire central portion.

In a special embodiment the fitting includes carrying out a least-squares fit, which provides good results for the fits used in the invention. The least-squares fit may be weighted. The weight is advantageously the inverse of the variance of the, preferably smoothed, detection data. The smoothing reduces the effect of the noise in the detection data.

In another special embodiment the fitting includes carrying out a Poisson maximum likelihood fit, which is adapted to fitting data having a Poisson distribution, such as the detection data. Whereas it is known to use Poisson optimisation to determine the image when the scale factor known from tail fitting, the invention uses Poisson optimisation to determine the value of a when the image is known.

In a special embodiment of the method the scatter estimate is determined in a series of iteration steps and the fitting is weighted, the weighting being adjusted between two of the iteration steps. This adjustment of the weights of the fit in between iteration steps can be applied to the above-mentioned least-squares fit and Poisson maximum likelihood fit.

The fitting procedure may include penalties, imposing restrictions on the scaling factor. A possible restriction is that a scaling factor must be positive.

The fitting is further improved if it is constrained to obtain scale factors larger than or equal to a given value. The given value is preferably positive.

The method for calculating a scatter estimate can advantageously be used in a method of conducting scatter correction for a tomographic scanner including a detector array for detecting radiation from a subject to measured detection data, wherein the method comprises the steps: collect detection data; calculate a scatter estimate according to the invention; and determine a scatter-corrected image from the detection data using the scatter estimate.

The method may include a series of iteration steps in which the image is determined and in which the region of the distribution over which the fitting is performed being increased between two of the iteration steps.

In the image reconstruction process the image is preferably constrained to positive values and/or, outside the subject, to zero values to obtain a reconstructed image that corresponds to a physically possible subject.

The extent of the subject is preferably determined using detection data and/or an image derived from the detection data. The extent may be determined using several procedures for determining the extent. In that case regions outside the subject may be defined as those regions that are outside the subject according to all of these procedures.

A second aspect of the invention relates to computer software for calculating a scatter estimate for scatter correction of detection data from a subject in a positron emission tomographic scanner, using a method according to any embodiment of the invention.

A third aspect of the invention relates to a data carrier comprising computer software according to any embodiment of the invention.

A fourth aspect of the invention relates to a tomographic scanner system including a detector array for detecting radiation from a subject to generate detection data, wherein the scanner system is adapted to calculate a scatter estimate for determining a scatter-corrected image of a subject in a tomographic scanner, using any embodiment of the method according to the invention.

These and other aspects of the invention will be apparent from and elucidated by the way of non-limiting examples with reference to the embodiments described hereinafter and illustrated in the accompanying drawings.

DETAILED DESCRIPTION OF THE INVENTION

Figure 1:
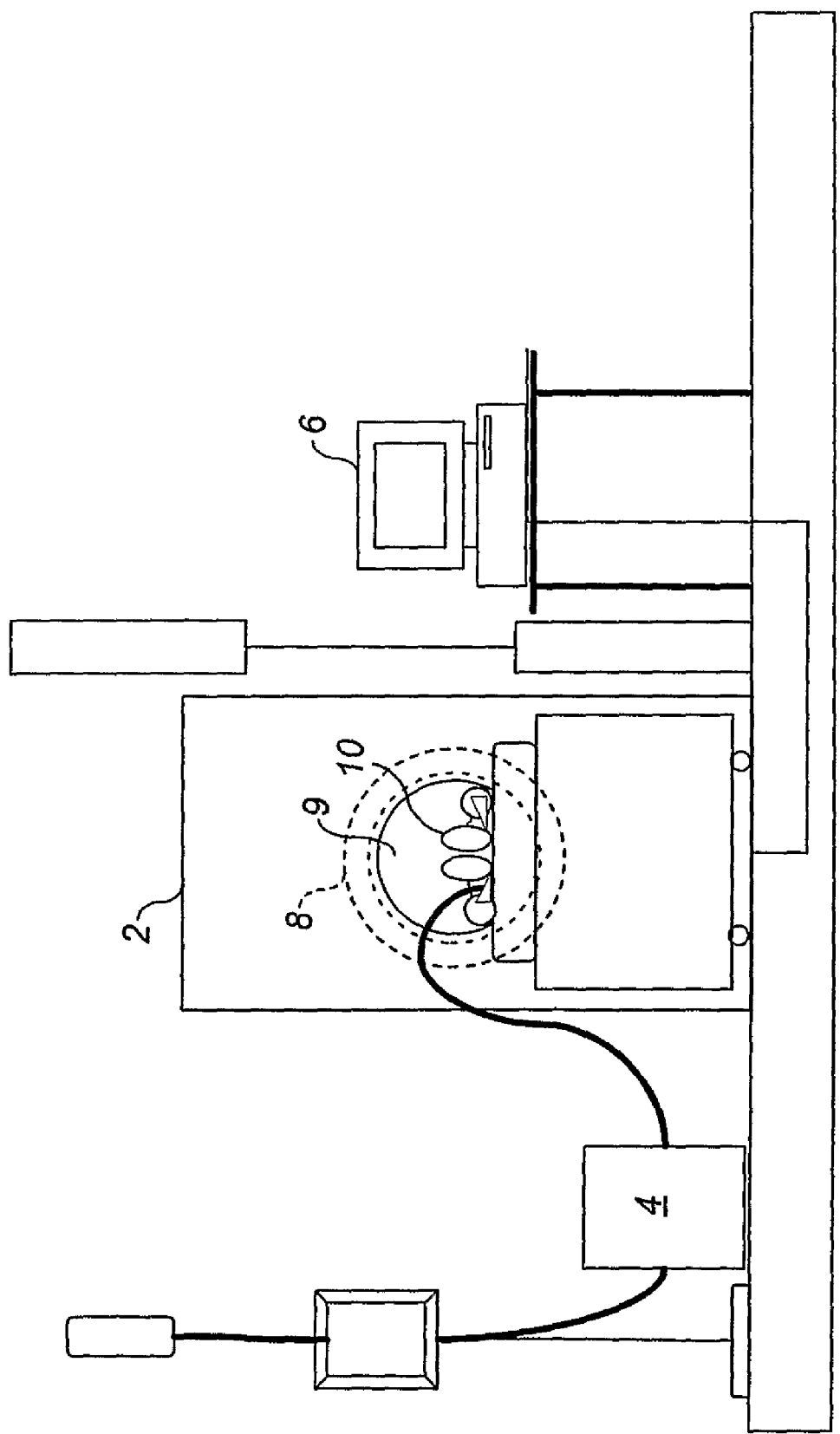
FIG. 1 is a schematic drawing of a PET scanning system.

FIG. 1 shows a tomographic scanner system, arranged in accordance with an embodiment of the invention, which includes a PET scanner 2, a tracer generator module 4 and an operator computer terminal 6. The scanner 2 includes a detector array 8 arranged about a scanning area 9, in which a subject 10 is located during a transmission scan and during an emission scan.

One embodiment of the invention relates to a PET scanner, for example, a PET scanner of the so-called Discovery™ ST type (manufactured by GE Healthcare). In this embodiment, the detectors in the detector array 8 are arranged in square detector blocks, each containing multiple detector elements. The detectors blocks are arranged in multiple rings, the rings being arranged adjacent one another along a scanner axis, perpendicular to the plane of the drawing.

Figure 2:
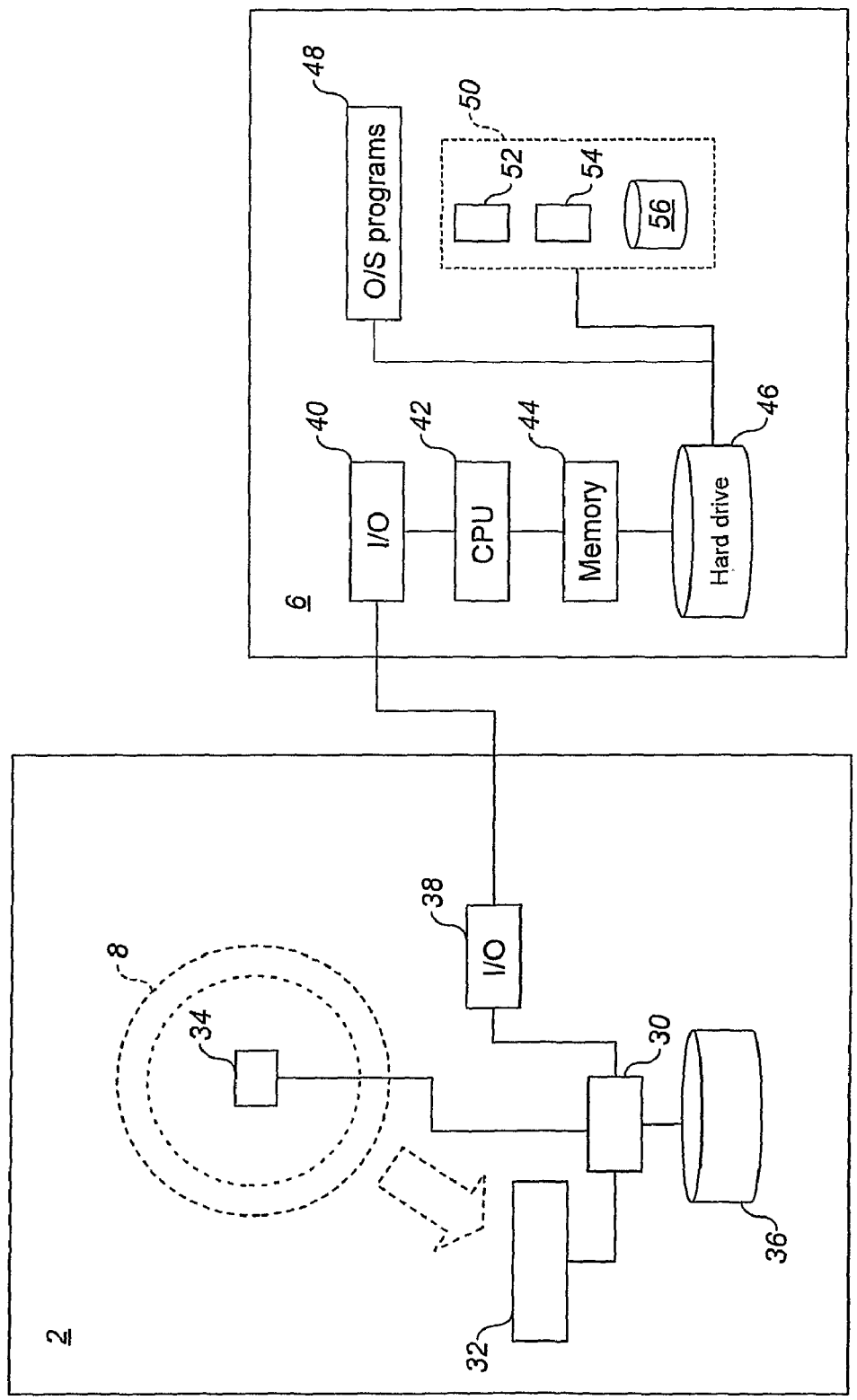
FIG. 2 is schematic drawing of data processing components in a PET scanning system.

As shown in FIG. 2, the PET scanner 2 includes a control unit 30, processing circuitry 32 for detection data received from the detector array, a motion detector 34, a memory 36 for storing the detection data and movement data, and an input/output (I/O) device 38. The computer terminal 6 includes a central processing unit (CPU) 42, a memory 44, a hard disc drive 46 and an I/O device 40, which facilitates interconnection of the computer 6 with the PET scanner 2.

Operating system programs 48 are stored on the hard disc drive 46, and control, in a known manner, low-level operation of the computer terminal 6. Program files and data 50 are also stored on the hard disc drive 46, and control, in a known manner, outputs to an operator via associated devices. The associated devices include a display, a pointing device and keyboard (not shown), which receive input from and output information to the operator via further I/O devices (not shown). Included in the program files 50 stored on the hard disc drive 46 are any motion correction software 52 and the image reconstruction software 54. A database 56 is used to store the detection data and any movement data transferred from the PET scanner 2.

In acquisition mode, the processing circuitry 32 processes all events detected in the detector array 8 and, by using a coincidence timing window, detects coincidences between the events which are recorded as coincidence counts. These coincidence counts may then be output in list-mode to data store 36, where it is stored as a list file for subsequent processing. Alternatively, the coincidence events are used to update a histogram. This histogram is output to data store 36 for further processing.

Figures 3, 4:
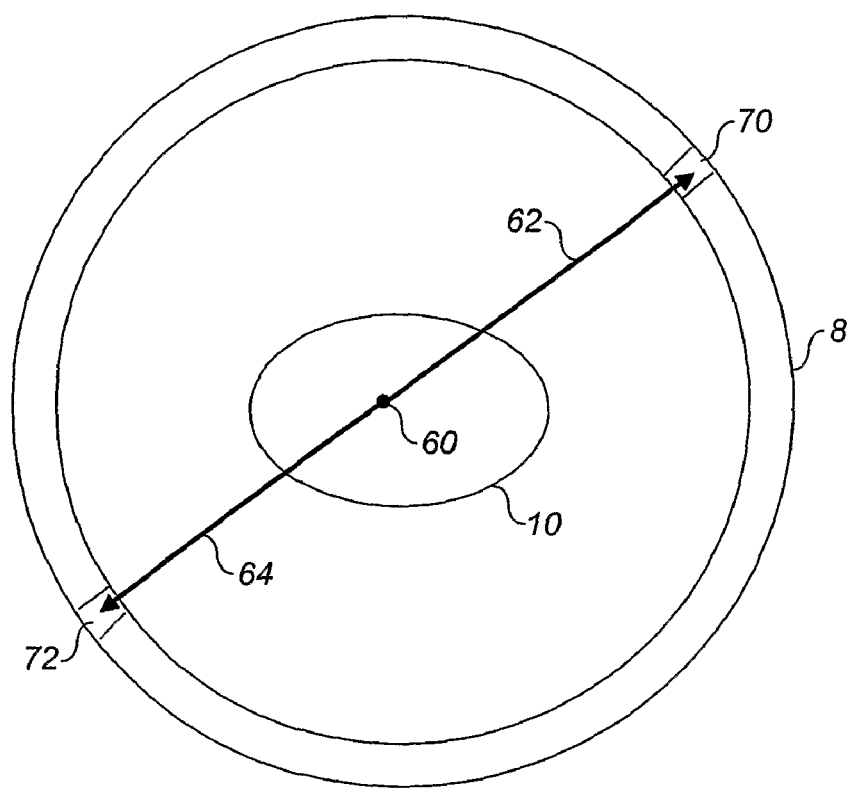
FIG. 3 shows a cross section of a detector array and a subject being scanned.
FIG. 4 shows a representation of a list mode file.

FIG. 3 illustrates features of operation of the PET scanner during an emission scan. During an emission scan, the subject 10 is placed in the scanning area and contains the tracer generated by the tracer generator module 4. FIG. 3 shows a positron emission event being registered in the detector array 8. The positron 60 annihilates and generates a first photon 62 travelling in one direction and a second photon 64 travelling in the opposite direction. The first photon is detected by a detector element 70 on one side of the detector array 8, and the second photon 64 is detected in a different detector element 72 on the other side of the detector array 8. As described above, the processing circuitry 32 registers the two detection events as a coincidence along a line of response (LOR) defined by the position of the two detector elements 70 and 72.

FIG. 4 shows a representation of a list file in which the detection data are stored in the memory 36. The file comprises three columns, one for entering the time t of an event and two columns for entering the detector elements $D_1$ and $D_2$ in which the event was detected. For each coincidence a record is entered in the file, the record comprising the time and two entries identifying the detector elements in which the event was detected. Each set of values $D_1$ and $D_2$ defines a LOR connecting detectors $D_1$ and $D_2$. Depending on the availability of other data, the list file may contain time-of-flight data and data on energy windows in which the events have been detected.

Figure 5A:
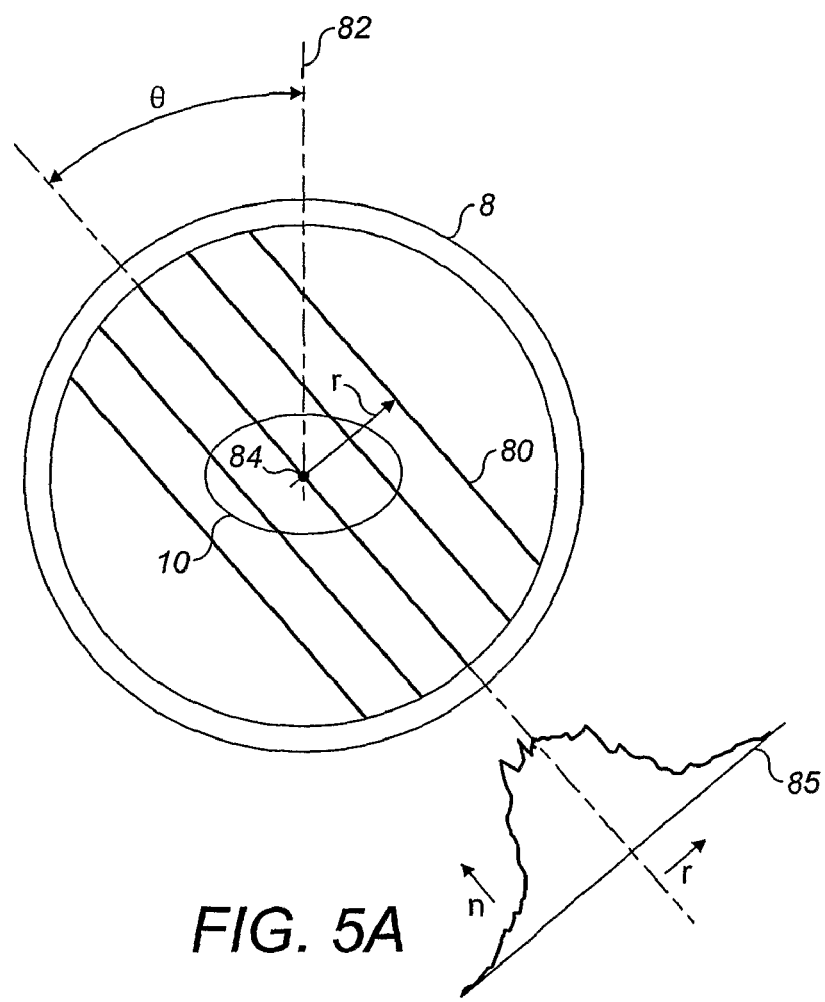
FIG. 5A shows a cross section of the detector array and parameters used in forming a sinogram.
Figure 5B:
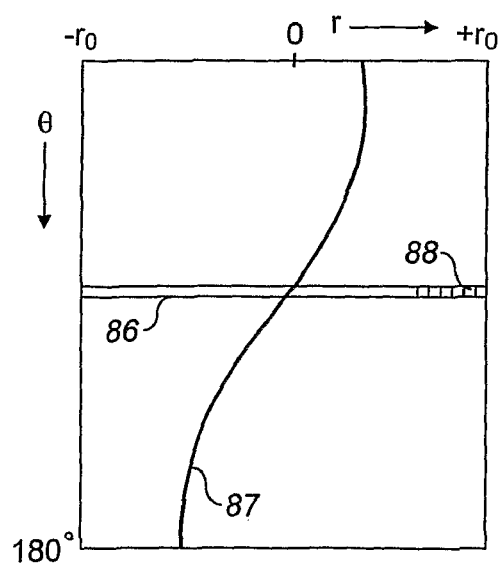
FIG. 5B shows a sinogram.

In some methods of processing detection data the list file is transformed to a sinogram presentation. FIG. 5 shows parameters used in forming (2-dimensional) sinograms. The transformation starts by assigning an angle θ and a distance r to each event or record in the list file. The angle θ is the angle at which the LOR of the record meets a reference axis 82. The distance r is the shortest distance between the LOR and the centre 84 of the detector array 8. Subsequently the transformation collects all records having a same angle θ. The Figure shows a series of LORs 80 having the same value of the angle θ. Graph 85 shows the distribution of events having this value of θ as counts n versus the distance r. The events shown in the graph 85 are stored as counts in a one-dimensional array 86, called a sinogram row. There is a sinogram row for each specific value of θ, the number of rows depending on the resolution of the scanner. Each row comprises a number of bins 88 commensurate with the spatial resolution of the scanner. Each bin in a row has assigned to it a specific value of the distance r, the distance running from $-r_0$ to $+r_0$, $r_0$ being the distance r pertaining to the first and last bin of the row. The count in a bin is increased by one for each record in the list file having the values of θ and r pertaining to the bin. The sinogram row is a projection of the radioisotope distribution in a slice of the subject in direction θ. The collection of sinogram rows for all angles θ between 0° and 180° forms a sinogram as shown in FIG. 5B. The sinogram derives its name from the fact that an off-centre point source in the subject shows up as a sinusoidal line, for example line 87, in the sinogram. If the scanner can collect data in and/or between different detector rings, multiple sinograms can be formed for different ring-pairs. If the scanner is able to record additional information such as the arrival in multiple energy windows or time-of-flight data, multiple sinograms can be formed, e.g. one for every pair of energy windows, and/or one for every TOF-window. If the data has been stored as histograms on the data store 36, it is conceptually already in the format of multiple sinograms.

There are several methods for reconstructing an image of the subject from the detection data. A method based on the point-spread function starts with a test scan using a point source in the scanning area. The detection data of the test scan, in list mode or sinogram mode, form the point-spread function of the scanner. Subsequently, a subject is scanned. The detection data of the subject are deconvolved with the point-spread function, resulting in an image of the subject. Another analytic method uses an inverse Fourier transform. The inverse Fourier transform of a two-dimensional sinogram results in a two-dimensional image of the subject. In iterative methods the quality of the image is improved in a series of repeated steps. It should be noted that in 3D PET scanning the two rings where the protons are detected correspond to two extra coordinates. Although the embodiments of the invention are described in terms of 2-D sinograms, the word 'sinogram' should be interpreted broadly to refer also to 3-D sinograms, e.g. one sinogram per ring pair, to sinograms based on TOF information, e.g. one sinogram per time difference, and to sinograms based on energy, e.g. one sinogram per energy window.

The word 'data' includes among others detection data from the photon detector array and data of the subject relating to position, movement, emission distribution and attenuation.

The image may be degraded by the presence of random events. An example of a random event is an accidental coincidence caused by two annihilations. A random-correction method forms an estimate of the random event rate, for instance by measuring the rate at which two photons are detected in two 10 ns wide windows at a 1 ms delay. Such a delayed detection cannot be caused by photons resulting from a single annihilation. The measured rate can be converted to a zero millisecond delay of the windows, which is the desired random event rate to be used for the correction.

There are several methods to correct the detection data for scattering, disclosed for example in the articles 'Correction for scattered radiation in a ring detector positron camera by integral transformation of the projections' by M. Bergstrom et al in Journal of Computer Assisted Tomography, Vol. 7 (1983) pages 42-50, 'Cross-plane scatter correction-point source deconvolution' by L. Shao and J. S. Karp in PET IEEE Transactions on Medical Imaging, vol. 10(3) (1991) pages 234-239 and 'A convolution-subtraction scatter correction method for 3-D PET' by B. L. Bailey and S. R. Meikle in Phys. Med. Biol., vol. 39 (1994) pages 941-954. In a first scatter-correction method an emitting point source is placed in a scattering medium that is representative for the type of study that will be performed and a test scan is made. The reconstructed image of the point source has a high spatial resolution component and a low spatial resolution background, the latter being due to scatter. This background represents the scatter point spread function of the scanner. The images of the subject are deconvolved with the scatter point spread function, resulting in scatter-corrected images. A similar method can be used directly on sinograms. The article 'Scatter modelling and correction strategies in fully 3-D PET' by H. Zaidi in Nuclear Medicine Communications 22, (2001) 1181-1184 presents a review of existing methods.

The correction for scatter is preferably based on a physical model of the scattering process, providing a scatter simulation. A method useful for high energy resolution scanners stores energy information in list mode for each detected event as disclosed in the above article of Ferreira. In another model the scattering process is described by a numerical calculation that integrates the scatter probability of a photon along its path from the annihilation location to the detector, as disclosed e.g. in the article 'Model-based scatter correction for fully 3D PET' by J. M. Ollinger in Phys. Med. Biol. Vol. 41 (1996) pages 153-176. The method starts with a reconstruction of the image without motion correction and without scatter correction or with scatter correction based on for example the scatter point spread function. The scatter sinogram of the image is calculated using the scatter events resulting from the physical model and an estimate of the attenuation in the subject. This scatter sinogram is subtracted from the measured sinogram, resulting in a scatter-corrected sinogram. A new image is reconstructed from the scatter-corrected sinogram. The new image can now be used as a second step in an iteration process to calculate again an improved scatter sinogram. The iteration process results in the scatter-corrected image.

It is known that the accuracy of the scatter correction is increased by including scale factors in the calculation. The scatter simulation, i.e. the result of the physical model, is multiplied with a scale factor to obtain a scatter estimate. In general, each 2D sinogram has its own scale factor, although each row or group of rows in a sinogram may have its own scale factor. In a known scatter correction method the value of the scale factor is determined by fitting the scatter estimate to the sinogram. This can be expressed as:

$$y \approx s\alpha \qquad (1)$$

where y represents the detection data, i.e. the counts in the sinogram, s the scatter simulation and α the scaling factor(s) for the sinogram. It should be noted that y and s are vectors having the dimension of the number of bins in a row of the sinogram.

Formula (1) is only valid in those bins that do not contain unscattered events. Therefore, the fit of the scatter estimate must be made over those bins. This set of bins T is usually located in the tails of the sinograms. There are various ways to determine T. For example, the sinogram used for attenuation correction can be thresholded. In this way T contains only bins that do not intersect the subject which means that they should not have any emission.

Figure 6:
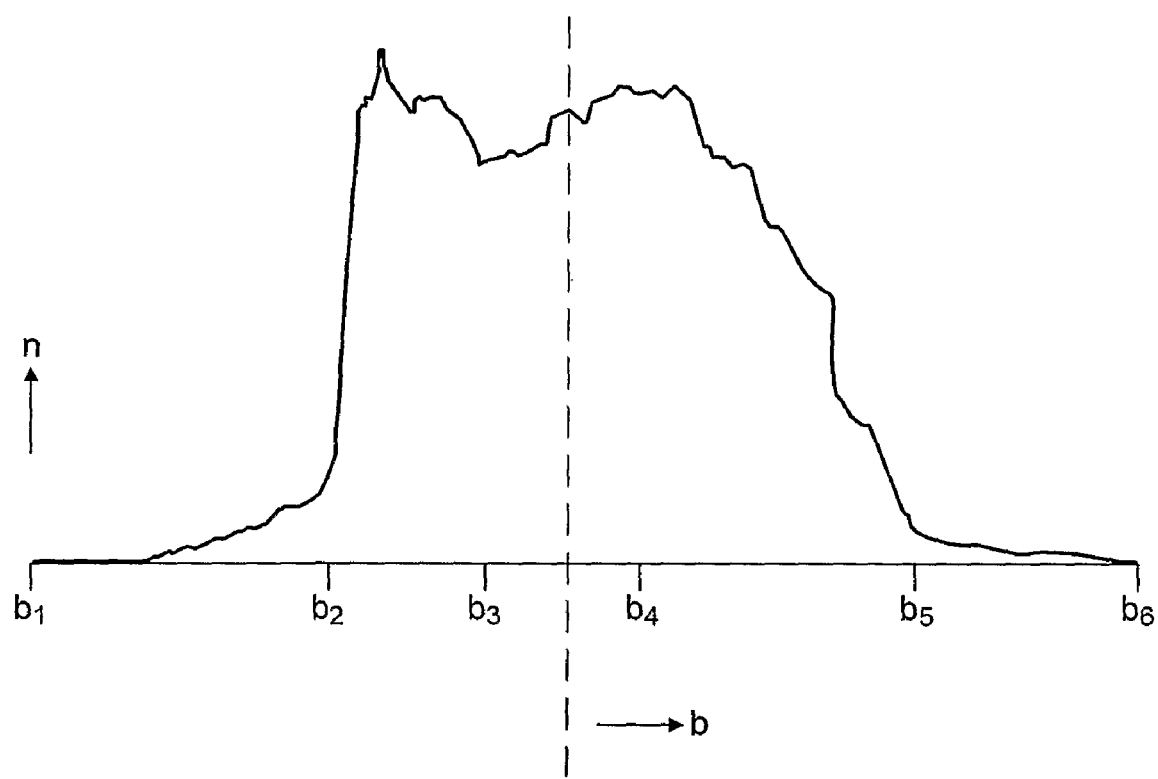
FIG. 6 shows a sinogram row.

When a least-squares fit is made, the value of the scaling factor α is equal to:

$$\alpha_i = \frac{\sum_{b \in B_i \cap T} y_b}{\sum_{b \in B_i \cap T} s_b} \qquad (2)$$

where i runs over the number of scale factors, $y_b$ is the detection data in bin b of the sinogram row i, $s_b$ is the scatter estimate for bin b and $B_i$ is the set of all bins that are multiplied by scale factor i. The two summations are over all bins b within the set $B_i$ of bins in the sinogram that belong to the set of bins T, i.e. over all tail bins. FIG. 6 shows the number of counts of detection data n as a function of the bin number in a sinogram row such as the one-dimensional array 86 in FIG. 5B. One tail in FIG. 6 is from bin $b_1$ to bin $b_2$, the second tail is from bin $b_5$ to bin $b_6$. A central portion of the distribution, from bin $b_2$ to bin $b_5$, contains events where the LOR intersects the subject. Bin $b_1$ may correspond to distance $-r_0$ and bin $b_6$ to distance $+r_0$ in FIG. 5B. Bins $b_2$ and $b_5$ are usually chosen well in the tail, because any unscattered data included in the fit strongly decreases the reliability of the value of the scale factor.

When the set T of tail bins is small, the fit may be unstable. Additionally, the fit is carried out over part of the detection data where the scatter simulation may be unreliable. Hence, even if a good fit can be made in the tail parts of the detection data, the scatter estimate need not necessarily be good in the central portion of the detection data, where the unscattered events of interest are.

An improved scatter estimate is obtained when, according to the invention, the scaling factor is determined from a fit, not only of the scatter estimate, but of the scatter estimate and an estimate of the unscattered events. This can be expressed as:

$$y \approx y^u + s\alpha \quad (3)$$

where $y^u$ is an estimate of the unscattered data, which may include a estimate of random events. The estimate $y^u$ can be computed from an initial estimate of the detection data, as discussed below.

The fit may be of the non-weighted or weighted least-squares type. In the latter case the value of the scaling factor $\alpha$ is equal to:

$$\alpha_i = \frac{\sum_{b \in B_i} w_b (y_b - y_b^u)}{\sum_{b \in B_i} w_b s_b} \quad (4)$$

wherein $w_b$ is the weight for bin b. The weight can be used to determine the bins to be included in the sums. When all weights are equal to 1, the fit extends over the width of the sinogram row. The weights can also be chosen equal to 1 in the tails (from bin $b_1$ to $b_2$ and from $b_5$ to $b_6$ in FIG. 6) or in part of the tails and decreasing from 1 to 0 in the regions of the central portion adjacent the tails. These regions are shown in the Figure from $b_2$ to $b_3$ and from $b_4$ to $b_5$. Bins $b_1$ and $b_6$ may be selected such as to exclude one or more bins in the tails from the fitting, e.g. because these bins contain a very low number of events.

A stable method for obtaining a scatter estimate is to change the weights in subsequent iteration steps. The change of weights may involve a change in the regions of the fit. It is possible to increase the region of the fit for subsequent iteration steps. In a particular embodiment a first fit is made using the tails only; this estimate of the scattered events is used to obtain a better approximation of the unscattered events in for example two iteration steps; in the next step the fit for the scaling factors is extended to the central portion of the distribution.

The weights in the fit area(s) may also be set to the inverse of the variance of the counts in the bins, as is common in least-squares fitting. The variance is equal to the number of counts for Poisson distributed data. For noisy data the variance can be set to the values of a smoothed version of the detection data or to the sum $y^u + y^s$, using e.g. a first-pass estimate of the scale factors.

A range of valid values for the scale factors is preferably imposed as constraints. For example, the scale factors should be positive. A stronger constraint can be imposed if the expected value of the scale factors is known. For example, if the scatter simulation only accounts for single scatter, the scale factors are expected to be larger than 1 as the true scatter distribution contains multiple scatter. In this case, it is beneficial to constrain the scale factors to be at least 1.

The fit may be improved further by imposing a penalty on the scale factors which will smooth the fitted scale factors. For example, a quadratic penalty can be added to the sum of squares to be minimised in the form:

$$\frac{1}{2} \sum_{ij} r_{ij} (\alpha_i - \alpha_j)^2 \quad (5)$$

wherein $r_{ij}$ are non-negative weight factors, one for each pair of scale factors, the value of which may decrease for increasing value of $|i-j|$. Alternatively, smoothness can be obtained by filtering the scale factors after the fit.

The above description of the scale factors are determined for the case of a single scatter estimate for a group of sinogram rows. This single scatter estimate will usually be a simulation of single scatter events, i.e. where only one photon of a pair generated in an annihilation is scattered once between the point of annihilation and the detector which detects the photon. It is also possible to use plural scatter simulations for a sinogram row. For example, a single scatter simulation and a double scatter simulation may be used. In the double scatter simulation one photon of a pair is scattered twice or each of the two photons scatters once. In the above formulae $s\alpha$ must be replaced by $$\sum_k s^k \alpha^k \quad (6)$$

where k runs over the plurality of scatter simulations. The plural values of the scale factor can be obtained from a fit. As observed before, the amount of data in the tails is not always sufficient to determine one value of the scale factor. The amount of data in the tails is in general insufficient to determine more than one value of the scale factor.

Instead of the least-squares fit a Poisson maximum-likelihood estimation method (ML) can be used. This amounts to finding the best estimate for $\alpha$ from Poisson-distributed data y which have a mean value $$\bar{y} = y^u + s\alpha \quad (7)$$

The equation for the log-likelihood L of measuring the detection data y given the scale factor(s) $\alpha$ and the unscattered data $y^u$ can be written as $$L(y \mid s, \alpha, y^u) = \sum_b y_b \log(y_b^u + (s\alpha)_b) - (y_b^u + (s\alpha)_b) - y_b! \quad (8)$$

The purpose of the ML method is to find the values for a that maximize L. Because of the non-linear nature of L, this is preferably done iteratively. The ML method may use the gradient descent or Newton's method for determining the best estimate of $\alpha$. An advantage of the ML method is that it imposes non-negativity on $\alpha$.

Alternatively, a Poisson-ML method known from image reconstruction in emission tomography can be used, such as the Maximum Likelihood Expectation Maximization (MLEM) method disclosed in the article "Maximum likelihood reconstruction for emission tomography" by Shepp L A and Vardi Y, IEEE Trans. Med. Imag. 1 (1982) 113-122. This can be seen from the fact that the above formulas (7) and (8) specify the same mathematical problem, where $y^u$ has the function of the constant background term and s that of the forward projection matrix.

These methods need expressions for the gradient of the log-likelihood with respect to α. In the case of a single scatter estimate this becomes $$\frac{\partial L}{\partial \alpha_i} = \sum_{b \in B_i} s_b \left[ \frac{y_b}{y_b^u + s_b \alpha_i} - 1 \right] \quad (9)$$

and similarly for multiple scatter estimates (formula (6))

$$\frac{\partial L}{\partial \alpha_i^k} = \sum_{b \in B_i} s_b^k \left[ \frac{y_b}{y_b^u + \sum_{k'} s_b^{k'} \alpha_i^{k'}} - 1 \right] \quad (10)$$

Some algorithms, such as Newton's method, need the Hessian of the log-likelihood, which is diagonal in the present case and its diagonal elements are for the case of multiple scatter estimates $$H_{ii} = \frac{\partial^2 L}{\partial \alpha_i^{k2}} = -\sum_{b \in B_i} s_b^{k2} \left[ \frac{y_b}{\left( y_b^u + \sum_{k'} s_b^{k'} \alpha_i^{k'} \right)^2} \right] \quad (11)$$

In principle, the Hessian depends on the current scale factors, but this dependence is usually weak. It is therefore possible to start the iteration with a good estimate for the scale factors, e.g. 1 if the scatter estimation is scaled correctly, and keep the Hessian constant for the iteration steps, thereby reducing computation time.

Similar to the least-squares fit, the ML method may be modified by adding penalties, similar to the one in formula (5), to the log-likelihood. As for ML, existing image reconstruction algorithms for emission tomography for penalised likelihood problems, such as the One Step Late algorithm, as disclosed in the article "Bayesian reconstruction from emission tomography data using a modified EM algorithm" by P. J Green, IEEE Tr. Med. Im., Vol. 9, No 1, (1990), pp. 84-93, and others mentioned in the review "Iterative reconstruction techniques in emission computed tomography" by J. Qi and R. Leahy, Phys. Med. Biol. 51 (2006) R541-R578, can be used in the current optimization problem as well.

As in the case of the least-squares fit, weight factors may be included as discussed in the text below formula (4). The article 'Weighted expectation maximization reconstruction algorithms with application to gated megavoltage tomography' by Jin Zhang, Daxin Shi, Mark A Anastasio, Jussi Sillanpaa and Jenghwa Chang in Phys. Med. Biol. 50 N299-N307 discloses a procedure to implement this in the Poisson log-likelihood method.

The following method reconstructs the image of the tracer using the improved scatter estimate according to the invention. The following steps can be distinguished.

1. Obtain a first scatter estimate and an estimate of the attenuation of the subject and scanner using known methods. The first scatter estimate may be zero.
2. Reconstruct an image from the detection data y using the initial scatter estimate $y^s$, for example by reconstructing the image from $y-y^s$ or using a more sophisticated method.
3. Process the reconstructed image by setting to zero all the activity outside the subject. In addition, all negative values in the image may be set to zero.
4. Determine a scatter simulation s from the image computed in step 3. The step may include the determination of further scatter simulations.
5. Determine a scatter-free estimate $y^u$ from the image computed in step 3.
6. Determine the value of α from the fit of $y^u+s\alpha$ to the detection data.
7. Multiply the scatter simulation s with the scale factor α to obtain a scaled scatter estimate $y^s$.
8. Reconstruct an image from the detection data y taking the scatter estimate $y^s$ into account.
9. Repeat steps 3 to 8 until the quality of the image and/or the scatter estimate is sufficient or does not improve anymore.

The 3$^{rd}$ step enforces that the final image estimate corresponds to a physically possible image. Without this step, the reconstructed image could contain activity outside the subject or have negative values. The step improves the stability of the method for reconstructing the image. When using a known iterative method in step 2 and 8 that imposes these constraints on the reconstructed image during the reconstruction process of the image, steps 2 and 3 (and 8 and 3) are combined.

The extent of the subject, e.g. a patient, in step 3 may be determined using different procedures. In a first procedure, where an image of the attenuation distribution or a CT or MRI image is available, the extent of the subject can be obtained by for example a threshold-based segmentation procedure. In a second procedure, the detection data itself is used. An image is reconstructed from detection data not corrected for scatter, possibly at low resolution. A threshold is set and any region having a value higher than the threshold is regarded as forming part of the subject. The threshold can for instance be set as 10% of the maximum value in the image. The threshold value can be refined by carrying out a histogram-based segmentation, where the histogram is for instance computed on the outside of the subject as determined by another method. In a third procedure the extent is determined using an image reconstructed from detection data not corrected for attenuation. The relatively sharp contour of the image can be used to define the extent of the subject. Alternative procedures are described in "Detection and validation of the body edge in low count emission tomography images", Computer Methods and Programs in Biomedicine, Volume 84, Issue 2-3, Pages 153-161 L. Barnden, J. Dickson, B. Hutton. The procedures that are based on detection data as opposed to the attenuation image avoid a potential problem that due to movement of a patient, some regions are incorrectly interpreted as a high scatter background. It may be advantageous to use several of the above procedures and use as final estimate of the outside of the subject those regions that are judged to be outside by all of these procedures.

The image in step 2 may be reconstructed from the detection data without scatter correction (first scatter estimate in step 1 is zero). Alternatively, an initial scatter estimate may be used in the image reconstruction of step 2, which reduces the number of calculation-intensive iteration steps 3 to 8 required for the desired image quality.

In a special embodiment of the method steps 5 and 6 are omitted in one or more iteration steps. As a result, the image is updated in each iteration step and the scale factors are updated only once in a series of steps.

The determination of the scatter simulation s requires only a low resolution version of the image, because the scatter distribution is relatively smooth. As a result, only a low resolution version of the unscattered data $y^u$ will be needed in the above iteration steps. The computations required for determining the image will be sped up, because the scale factors can be determined from smaller sinograms, obtained by averaging the detection data over several bins. By interpolation of the smaller scatter sinogram, the scatter estimate can be upsampled to the dimensions of the measured data for reconstruction of the image with the desired resolution.

The determination of a new scatter-free estimate $y^u$ from the image (step 5) is a process common in iterative reconstruction methods. For every bin in $y^u$ it involves summing the radioisotope activity in the image weighted by the detection probabilities which have to be computed assuming that any scattered photons are not detected. This can for instance be approximated by taking line integrals through the image along the LORs, and weighting the result with attenuation and detection efficiency factors. This process is discussed in the above-mentioned review by J. Qi and R. Leahy. For PET, the detected coincidences also contain so-called accidental coincidences or 'randoms'. An estimate for the distribution of the 'randoms' may be added to $y^u$ or subtracted from the detection data before further processing. Several ways to compute this distribution of randoms are disclosed in the articles "A Study of Bias for various Iterative Reconstruction Methods in PET" by D. Hogg and K. Thielemans et al, Proc. Of the IEEE Medical Imaging Conference 2002, "Random coincidence estimation from single event rates on the Discovery ST PET/CT scanner", Steams, C. W. McDaniel, D. L. Kohlmyer, S. G. And, P. R. Geiser, B. P. Shanmugam, V., IEEE Nuclear Science Symposium Conference Record, 2003 Volume 5, pp 3067-3069 and "Correction Methods for Random Coincidences in Fully 3D Whole-Body PET: Impact on Data and Image Quality" by D. Brasse, P. Kinahan, Journal of Nuclear Med. Vol. 46 No. 5 May 2005.

What is claimed is:

1. A method for calculating a scatter estimate for scatter correction of detection data from a subject in a tomographic scanner, the detection data representing the scattered events and unscattered events of photons emitted in the subject, the method comprising the steps of:
   determining an estimate of the unscattered events;
   determining a simulation of the scattered events;
   determining a value of a scale factor by fitting the sum of the estimate of the unscattered events and a product of the scale factor and the simulation of the scattered events to the detection data ; and
   determining the scatter estimate as the product of the scale factor having said value and the simulation of the scattered events.

2. A method according to claim 1, wherein the detection data includes a distribution having a central portion flanked by tails and wherein the fitting is performed over a region of the distribution including at least part of the tails and at least part of the central portion.

3. A method according to claim 1, wherein the step of determining the scatter estimate further comprises the step of determining in a series of iteration steps, the region of the distribution over which the fitting is performed being increased between two of the iteration steps.

4. A method according to claim 1, wherein the fitting is performed over optionally part of the tails and the entire central portion.

5. A method according to claim 1, wherein the fitting further comprises the step of carrying out a least-squares fit.

6. A method according to claim 5, wherein the least-squares fit is weighted with the inverse of the variance of the smoothed detection data.

7. A method according to claim 1, wherein the fitting further comprises the step of carrying out a Poisson maximum likelihood fit.

8. A method according to claim 1, wherein the step of determining the scatter estimate further comprises the steps of performing a series of iteration steps and weighting the fitting, with the weighting being adjusted between two of the iteration steps.

9. A method according to claim 1, wherein the fitting uses penalties.

10. A method according to claim 1, wherein the fitting is constrained to obtain scale factors greater than or equal to a given value.

11. A method of conducting scatter correction for a tomographic scanner including a detector array for detecting radiation from a subject, wherein the method comprises the steps:
    collecting detection data;
    calculating a scatter estimate according to claim 1; and
    determinging a scatter-corrected image from the detection data using the scatter estimate.

12. A method according to claim 11, in which the step of determining the image includes a series of iteration steps, the region of the distribution over which the fitting is performed being increased between two of the iteration steps.

13. A method according to claim 11, wherein the image is constrained to positive values.

14. A method according to claim 11, wherein the image is constrained to zero outside the subject.

15. A method according to claim 14, wherein the extent of the subject is determined using detection data and/or an image derived from the detection data.

16. A non-transitory data carrier comprising computer software for calculating a scatter estimate for scatter correction of detection data from a subject in a positron emission tomographic scanner, using a method according to claim 1.

17. A tomographic scanner system including a detector array for detecting radiation from a subject to generate detection data, wherein the scanner system is adapted to calculate a scatter estimate for determining a scatter-corrected image of the subject, using a method according to claim 1.

* * * * *